United States Patent
Misaki et al.

(10) Patent No.: US 9,920,143 B2
(45) Date of Patent: Mar. 20, 2018

(54) FLUORINE-CONTAINING HIGHLY BRANCHED POLYMER AND EPOXY RESIN COMPOSITION CONTAINING THE SAME

(71) Applicant: NISSAN CHEMICAL INDUSTRIES, LTD., Tokyo (JP)

(72) Inventors: Tomoko Misaki, Funabashi (JP); Motonobu Matsuyama, Funabashi (JP); Masayuki Haraguchi, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/406,277

(22) PCT Filed: Jun. 6, 2013

(86) PCT No.: PCT/JP2013/065730
§ 371 (c)(1),
(2) Date: Dec. 8, 2014

(87) PCT Pub. No.: WO2013/183721
PCT Pub. Date: Dec. 12, 2013

(65) Prior Publication Data
US 2015/0158959 A1    Jun. 11, 2015

(30) Foreign Application Priority Data

Jun. 6, 2012 (JP) ................. 2012-129397

(51) Int. Cl.
| | | |
|---|---|---|
| C08F 24/00 | (2006.01) | |
| C09D 163/00 | (2006.01) | |
| C08L 37/00 | (2006.01) | |
| C08L 63/00 | (2006.01) | |
| C09D 133/14 | (2006.01) | |
| C09D 133/16 | (2006.01) | |

(52) U.S. Cl.
CPC .............. *C08F 24/00* (2013.01); *C08L 37/00* (2013.01); *C08L 63/00* (2013.01); *C09D 133/14* (2013.01); *C09D 133/16* (2013.01); *C09D 163/00* (2013.01)

(58) Field of Classification Search
CPC ...................................... C08L 63/00
USPC ........................................ 523/433
See application file for complete search history.

(56) References Cited

U.S. PATENT DOCUMENTS

| | | | |
|---|---|---|---|
| 2002/0006586 A1* | 1/2002 | Xu et al. ................. | 430/321 |
| 2004/0082699 A1* | 4/2004 | Brown ..................... | B01L 3/00 524/462 |
| 2005/0038178 A1* | 2/2005 | Von Schmittou ...... | C08F 214/18 524/556 |
| 2006/0058428 A1* | 3/2006 | Nair ...................... | C07D 303/08 523/400 |
| 2007/0207417 A1* | 9/2007 | Fujiwara ................ | G03C 1/49872 430/619 |
| 2012/0135206 A1* | 5/2012 | Haraguchi et al. ...... | 428/195.1 |

FOREIGN PATENT DOCUMENTS

| | | |
|---|---|---|
| JP | H04-221344 A | 8/1992 |
| JP | H05-32750 A | 2/1993 |
| JP | 2003-089759 A | 3/2003 |
| JP | 2004-144568 A | 5/2004 |
| JP | 2005-272700 A | 10/2005 |
| JP | 2012-104697 A | 5/2012 |
| WO | 2010/137724 A1 | 12/2010 |

OTHER PUBLICATIONS

Sep. 17, 2013 International Search Report issued in International Application No. PCT/JP2013/065730.
Sep. 17, 2013 Written Opinion of the International Searching Authority issued in International Application No. PCT/JP2013/065730.

* cited by examiner

*Primary Examiner* — Megan McCulley
(74) *Attorney, Agent, or Firm* — Oliff PLC

(57) ABSTRACT

A fluorine-containing highly branched polymer obtained by polymerizing a polyfunctional monomer A that has two or more radically polymerizable double bonds and all or a portion of which has a bisphenol structure, a monomer B having a fluoroalkyl group and at least one radically polymerizable double bond, within a molecule, and a monomer C having at least one ring-opening polymerizable group selected from the group including an epoxy group and an oxetanyl group, and having at least one radically polymerizable double bond, within a molecule, under the presence of a polymerization initiator D with an amount of 5% by mole to 200% by mole to the number of moles of the polyfunctional monomer A; an epoxy resin composition including the polymer; and an epoxy resin cured product obtained from the resin composition.

30 Claims, 8 Drawing Sheets

FLUORINE-CONTAINING HIGHLY BRANCHED POLYMER AND EPOXY RESIN COMPOSITION CONTAINING THE SAME

TECHNICAL FIELD

The present invention relates to a fluorine-containing highly branched polymer, an epoxy resin composition including the polymer, and a cured epoxy resin product obtained from the resin composition.

BACKGROUND ART

In recent years, polymer (macromolecular) materials have been increasingly utilized in a variety of fields. Along with this, in each field, properties of surfaces and interfaces of polymers have become important, in addition to properties of polymers as a matrix. For example, by using a fluorine compound having a lower surface energy as a surface modifying agent, properties for controlling surfaces and interfaces, such as water repellency, oil repellency, antifouling properties, non-stickiness, separation properties, mold release properties, smoothness, abrasion resistance, antireflective properties, and chemical resistance are expected to be improved, which therefore has been proposed in various kinds.

As one method for modifying polymer surfaces, a method in which a fluorine-containing highly branched polymer is added to a matrix polymer has been known (Patent Document 1).

An epoxy resin is a compound having two or more epoxy groups within its molecule, and is a functional resin resulting in a cured product that is excellent in adhesiveness, chemical resistance, heat resistance, and electric insulation upon a chemical reaction with a curing agent. By utilizing such properties, epoxy resins have been used in a variety of fields, such as paint, electronic materials, electric materials, adhesives, building materials, civil engineering materials, and composite materials. Despite their general-purpose applicability, epoxy resins are usually not highly compatible with polymers having functional groups such as fluorine groups and silicone groups. Therefore, prior arts relating to surface modification attained by addition of polymers having functional groups cannot be found easily.

As a method for modifying epoxy resins, a method in which a silicon epoxy condensate is generated by causing epoxy resins to react with silicone resins has been known. Such reactions are described in technical reports provided by Dow Corning Corp. and Shell Chemical Company, which roughly explains how to use their products. In addition, a fluorine modified phenolic resin has been shown to be effective as a modifying agent for thermosetting resins such as epoxy resins (Patent Document 2).

PRIOR ART DOCUMENTS

Patent Documents

Patent Document 1: WO 2010/137724 Pamphlet
Patent Document 2: Japanese Patent Application Publication No. H05-032750 (JP H05-032750 A)

SUMMARY OF THE INVENTION

Problem to be Solved by the Invention

However, Patent Document 2 shows no specific example in which a fluorine modified phenolic resin is used as an additive for a general-purpose epoxy resin. Accordingly, compatibility of the fluorine modified phenolic resin, and the surface properties of the obtained cured product are also not described at all.

Moreover, if a surface modifying agent with poor compatibility is added, the surface of the film may not become uniform at the time of film forming, resulting in variations in surface properties. Thus, surface modifying agents with higher compatibility have been in demand.

Means for Solving the Problem

As a result of intensive study to solve the problems described above, the inventors of the present invention have found that when a fluorine-containing highly branched polymer that can be obtained by introducing a fluoroalkyl group as well as an epoxy group or an oxetanyl group into a highly branched polymer having a bisphenol structure, is used as a surface modifying agent for an epoxy resin, the fluorine-containing highly branched polymer has excellent compatibility with the epoxy resin, and further gives water repellency and liquid repellency to the epoxy resin. Thus, the present invention has been completed.

Specifically, the present invention relates to, as a first aspect, a fluorine-containing highly branched polymer obtained by polymerizing a polyfunctional monomer A that has two or more radically polymerizable double bonds and all or a portion of which has a bisphenol structure, a monomer B having a fluoroalkyl group and at least one radically polymerizable double bond, within a molecule, and a monomer C having at least one ring-opening polymerizable group selected from the group consisting of an epoxy group and an oxetanyl group, and having at least one radically polymerizable double bond, within a molecule, under the presence of a polymerization initiator D with an amount of 5% by mole to 200% by mole to the number of moles of the polyfunctional monomer A;

as a second aspect, the fluorine-containing highly branched polymer according to the first aspect, in which the polyfunctional monomer A is a compound having either or both of a vinyl group and a (meth)acryl group;

as a third aspect, the fluorine-containing highly branched polymer according to the second aspect, in which the polyfunctional monomer A is a divinyl compound or a di(meth)acrylate compound;

as a fourth aspect, the fluorine-containing highly branched polymer according to the third aspect, in which the polyfunctional monomer A includes a compound of Formula [1]:

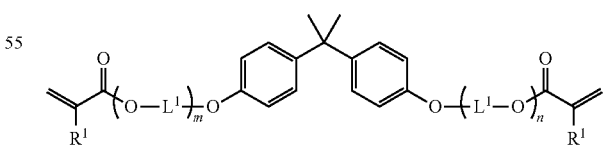

(where $R^1$ is a hydrogen atom or a methyl group; each $L^1$ is independently a $C_{1-6}$ alkylene group; and each of m and n is independently an integer of 0 to 30);

as a fifth aspect, the fluorine-containing highly branched polymer according to the fourth aspect, in which the polyfunctional monomer A is the compound of Formula [1] as described in the fourth aspect;

as a sixth aspect, the fluorine-containing highly branched polymer according to the first aspect, in which a monomer belonging to the polyfunctional monomer A and not having a bisphenol structure, is a compound having either or both of a vinyl group and a (meth)acryl group;

as a seventh aspect, the fluorine-containing highly branched polymer according to the sixth aspect, in which the monomer belonging to the polyfunctional monomer A and not having a bisphenol structure, is divinylbenzene and/or ethylene glycol di(meth)acrylate;

as an eighth aspect, the fluorine-containing highly branched polymer according to the first aspect, in which the monomer B is a compound having either or both of a vinyl group and a (meth)acryl group;

as a ninth, aspect, the fluorine-containing highly branched polymer according to the eighth aspect, in which the monomer B is a compound of Formula [2]:

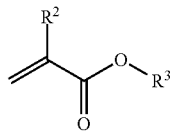

[2]

(where $R^2$ is a hydrogen atom or a methyl group; and $R^3$ is a $C_{2-12}$ fluoroalkyl group optionally substituted with a hydroxy group);

as a tenth aspect, the fluorine-containing highly branched polymer according to the ninth aspect, in which the monomer B is a compound of Formula [3]:

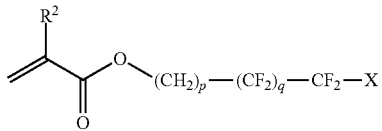

[3]

(where $R^2$ is the same as that defined in Formula [2]; X is a hydrogen atom or a fluorine atom; p is 1 or 2; and q is an integer of 0 to 5);

as an eleventh aspect, the fluorine-containing highly branched polymer according to the first aspect, in which the monomer C is a compound having either or both of a vinyl group and a (meth)acryl group;

as a twelfth aspect, the fluorine-containing highly branched polymer according to the eleventh aspect, in which the monomer C is a compound of Formula [4]:

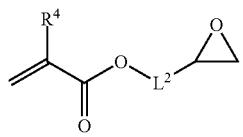

[4]

(where $R^4$ is a hydrogen atom or a methyl group; $L^2$ is a single bond or a $C_{1-12}$ alkylene group that optionally contains an ether bond or an ester bond);

as a thirteenth aspect, the fluorine-containing highly branched polymer according to the first aspect, in which the polyfunctional monomer A includes a compound of Formula [1], the monomer B is a compound of Formula [2], and the monomer C is a compound of Formula [4]:

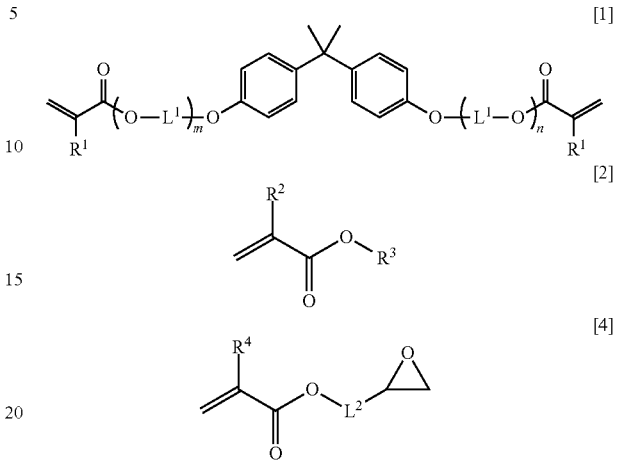

(where each of $R^1$, $R^2$, and $R^4$ is independently a hydrogen atom or a methyl group; $R^3$ is a $C_{2-12}$ fluoroalkyl group optionally substituted with a hydroxy group; each $L^1$ is independently a $C_{1-6}$ alkylene group; $L^2$ is a single bond or a $C_{1-12}$ alkylene group that optionally contains an ether bond or an ester bond; and each of m and n is independently an integer of 0 to 30);

as a fourteenth aspect, the fluorine-containing highly branched polymer according to the thirteenth aspect, in which the polyfunctional monomer A is a compound of Formula [1], and divinylbenzene and/or ethylene glycol di(meth)acrylate;

as a fifteenth aspect, the fluorine-containing highly branched polymer according to the first aspect, in which the polymerization initiator D is an azo polymerization initiator;

as a sixteenth aspect, the fluorine-containing highly branched polymer according to the fifteenth aspect, in which the polymerization initiator D is dimethyl 2,2'-azobisisobutyrate;

as a seventeenth aspect, the fluorine-containing highly branched polymer according to any one of the first to the sixteenth aspects, in which the fluorine-containing highly branched polymer is obtained by using the monomer B with an amount of 5% by mole to 300% by mole to the number of moles of the polyfunctional monomer A;

as an eighteenth aspect, the fluorine-containing highly branched polymer according to any one of the first to the sixteenth aspects, in which the fluorine-containing highly branched polymer is obtained by using the monomer C with an amount of 10% by mole to 300% by mole to the number of moles of the polyfunctional monomer A;

as a nineteenth aspect, a varnish comprising: the fluorine-containing highly branched polymer as described in any one of the first to the eighteenth aspects;

as a twentieth aspect, a thin film comprising: the fluorine-containing highly branched polymer as described in any one of the first to the eighteenth aspects;

as a twenty-first aspect, a surface modifying agent for an epoxy resin, comprising: the fluorine-containing highly branched polymer as described in any one of the first to the eighteenth aspects;

as a twenty-second aspect, a method for performing surface modification on an epoxy resin, the method comprising: mixing the fluorine-containing highly branched polymer as described in any one of the first to the eighteenth aspects with an epoxy resin;

as a twenty-third aspect, an epoxy resin composition comprising: (a) the fluorine-containing highly branched polymer as described in any one of the first to the eighteenth aspects; (b) an epoxy resin; and (c) a curing agent;

as a twenty-fourth aspect, the resin composition according to the twenty-third aspect, in which the content of (a) the fluorine-containing highly branched polymer is 0.01 parts by mass to 20 parts by mass relative to 100 parts by mass of the total mass of (b) the epoxy resin and (c) the curing agent;

as a twenty-fifth aspect, the resin composition according to the twenty-fourth aspect, further comprising (d) a solvent;

as a twenty-sixth aspect, an epoxy resin cured product obtained from the resin composition as described in any one of the twenty-third to the twenty-fifth aspects; and as a twenty-seventh aspect, a method for manufacturing a fluorine-containing highly branched polymer, the method characterized by comprising: polymerizing a polyfunctional monomer A that has two or more radically polymerizable double bonds and all or a portion of which has a bisphenol structure, a monomer B having a fluoroalkyl group and at least one radically polymerizable double bond, within a molecule, and a monomer C having at least one ring-opening polymerizable group selected from the group consisting of an epoxy group and an oxetanyl group, and having at least one radically polymerizable double bond, within a molecule, under the presence of a polymerization initiator D with an amount of 5% by mole to 200% by mole to the number of moles of the polyfunctional monomer A.

Effects of the Invention

Because the fluorine-containing highly branched polymer of the present invention has a branched structure that is intentionally added, molecules of the fluorine-containing highly branched polymer are less tangled compared to those of a linear polymer. Therefore, the fluorine-containing highly branched polymer of the present invention behaves like a fine particle, resulting in high solubility to an organic solvent and high dispersibility to a resin. Accordingly, when a formed body is produced by mixing the fluorine-containing highly branched polymer of the present invention with a resin, the fine particle-like highly branched polymer can easily be segregated to an interface (the surface of the formed body) to improve the modification of the resin surface.

In particular, by introducing a bisphenol structure into the main chain of the fluorine-containing highly branched polymer of the present invention, an affinity to an epoxy resin, and dispersibility to an epoxy resin are improved. Therefore, when a resin formed product is produced by mixing the fluorine-containing highly branched polymer with an epoxy resin composition, an obtained body has a uniformly modified surface, and is water repellent and oil repellent.

Further, when the resin formed product, such as a film, is produced by using an epoxy resin composition mixed with the fluorine-containing highly branched polymer of the present invention, the fluorine-containing highly branched polymer exists more on a surface (interface) of the formed product than the inside (deep portion) of the formed product. Therefore, the resin formed product has excellent mold release properties to a variety of machines, such as a mixing machine and a forming machine, and to a mold; and has excellent separation properties to other resin formed products such as films.

MODES FOR CARRYING OUT THE INVENTION

<Fluorine-Containing Highly Branched Polymer>

Figure 1:
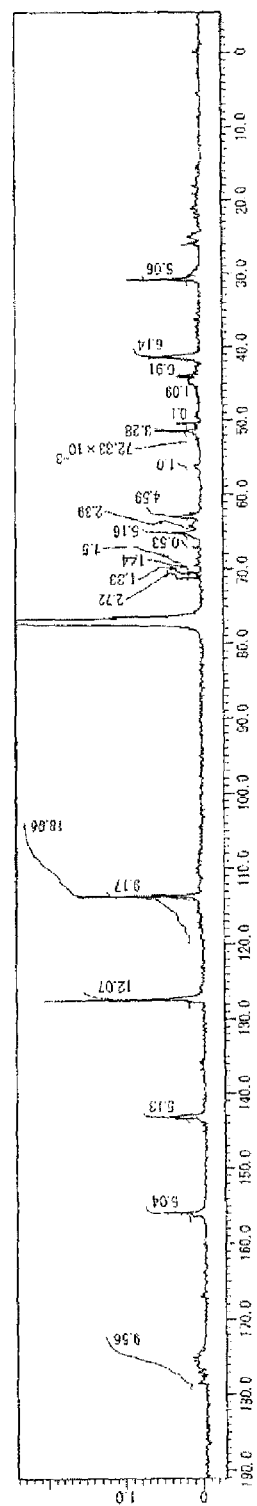
FIG. 1 shows a $^{13}C$ NMR spectrum of highly branched polymer 1 obtained in Example 1.

A fluorine-containing highly branched polymer of the present invention can be obtained by polymerizing a polyfunctional monomer A that has two or more radically polymerizable double bonds and all or a portion of which has a bisphenol structure, a monomer B having a fluoroalkyl group and at least one radically polymerizable double bond, within its molecule, and a monomer C having at least one ring-opening polymerizable group selected from the group consisting of an epoxy group and an oxetanyl group, and having at least one radically polymerizable double bond, within its molecule, under the presence of a polymerization initiator D with an amount of 5% by mole to 200% by mole to the number of moles of the polyfunctional monomer A. The fluorine-containing highly branched polymer of the present invention is what is called an initiator-fragment incorporation radical polymerization (IFIRP)-type fluorine-containing highly branched polymer, and has the fragment of a polymerization initiator D used for polymerization at an end thereof.

If necessary, the fluorine-containing highly branched polymer of the present invention may be obtained by further copolymerizing another monomer not belonging to the polyfunctional monomer A, the monomer B, and the monomer C described above, unless the effects of the present invention are impaired.

[Polyfunctional Monomer A]

In the present invention, a polyfunctional monomer A that has two or more radically polymerizable double bonds and all or a portion of which has a bisphenol structure, preferably has either or both of a vinyl group and a (meth)acryl group and all or portion of which has a bisphenol structure. Particularly preferably, the polyfunctional monomer A is a divinyl compound or a di(meth)acrylate compound, which contains a bisphenol structure. Examples of the bisphenol structure include structures of bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, and bisphenol Z. Among them, a bisphenol A structure is preferable, and more preferably, the polyfunctional monomer A contains a compound of Formula [1] below. Note that, in the present invention, the (meth)acrylate compound refers to both an acrylate compound and a methacrylate compound. For example, (meth)acrylic acid refers to acrylic acid and methacrylic acid.

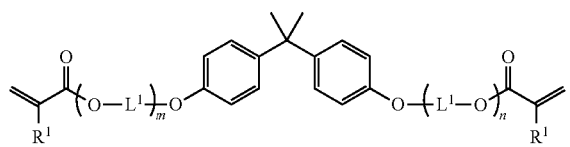

[1]

(where $R^1$ is a hydrogen atom or a methyl group; each $L^1$ is independently a $C_{1-6}$ alkylene group; and each of m and n is independently an integer of 0 to 30.)

Examples of the $C_{1-6}$ alkylene group represented by $L^1$ include a methylene group, an ethylene group, a trimethylene group, a methylethylene group, a tetramethylene group, a 1-methyltrimethylene group, a pentamethylene group, a 2,2-dimethyltrimethylene group, and a hexamethylene group.

Among them, a methylene group, an ethylene group, or a trimethylene group is preferable.

Regarding m and n, a value obtained by m+n is preferably 0 to 30.

Examples of the polyfunctional monomer A include bisphenol A di(meth)acrylate, methoxylated bisphenol A di(meth)acrylate, ethoxylated bisphenol A di(meth)acrylate (2.3 mol, 2.6 mol, 3 mol, 4 mol, 10 mol, or 17 mol of an ethoxy group, or the like), propoxylated bisphenol A di(meth)acrylate, propoxylated ethoxylated bisphenol A di(meth)acrylate (12 mol of a propoxy group 16 mol of an ethoxy group, or the like).

Among them, ethoxylated bisphenol A di(meth)acrylate or propoxylated bisphenol A di(meth)acrylate is preferable.

Among the polyfunctional monomer A, a monomer not having any bisphenol structures preferably has either or both of a vinyl group and a (meth)acryl group. Particularly preferably, the monomer is a divinyl compound or a di(meth)acrylate compound.

Examples of the monomer include the organic compounds described in (A1) to (A7) below.

(A1) vinyl hydrocarbons:
(A1-1) aliphatic vinyl hydrocarbons; isoprene, butadiene, 3-methyl-1,2-butadiene, 2,3-dimethyl-1,3-butadiene, 1,2-polybutadiene, pentadiene, hexadiene, and octadiene;
(A1-2) alicyclic vinyl hydrocarbons; cyclopentadiene, cyclohexadiene, cyclooctadiene, and norbornadiene;
(A1-3) aromatic vinyl hydrocarbons; divinylbenzene, divinyltoluene, divinylxylene, trivinylbenzene, divinylbiphenyl, divinylnaphthalene, divinylfluorene, divinylcarbazole, and divinylpyridine;
(A2) vinyl esters, allyl esters, vinyl ethers, allyl ethers, and vinyl ketones:
(A2-1) vinyl esters; adipic acid divinyl ester, maleic acid divinyl ester, phthalic acid divinyl ester, isophthalic acid divinyl ester, itaconic acid divinyl ester, and vinyl (meth)acrylate;
(A2-2) allyl esters; maleic acid diallyl ester, phthalic acid diallyl ester, isophthalic acid diallyl ester, adipic acid diallyl ester, and allyl(meth)acrylate;
(A2-3) vinyl ethers; divinyl ether, diethylene glycol divinyl ether, and triethylene glycol divinyl ether;
(A2-4) allyl ethers; diallyl ether, diallyloxyethane, triallyloxyethane, tetraallyloxyethane, tetraallyloxypropane, tetraallyloxybutane, and tetramethallyloxyethane;
(A2-5) vinyl ketones; divinyl ketone and diallyl ketone;
(A3) (meth)acrylic acid esters: ethylene glycol di(meth)acrylate, triethylene glycol di(meth)acrylate, propylene glycol di(meth)acrylate, neopentyl glycol di(meth)acrylate, trimethylolpropane tri(meth)acrylate, ditrimethylolpropane tetra(meth)acrylate, glycerol tri(meth)acrylate, pentaerythritol tetra(meth)acrylate, alkoxy titanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclo[$5.2.1.0^{2,6}$]-decanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecylenoxy ethylene glycol di(meth)acrylate, bis[4-(meth)acryloyl thiophenyl]sulfide, bis[2-(meth)acryloyl thioethyl]sulfide, 1,3-adamantanediol di(meth)acrylate, and 1,3-adamantanedimethanol di(meth)acrylate;
(A4) vinyl compounds having polyalkylene glycol chains: polyethylene glycol (300 of the molecular weight) di(meth)acrylate and polypropylene glycol (500 of the molecular weight) di(meth)acrylate;
(A5) nitrogen-containing vinyl compounds: diallylamine, diallyl isocyanurate, diallyl cyanurate, methylene bis(meth)acrylamide, and bismaleimide;
(A6) silicon-containing vinyl compounds: dimethyldivinylsilane, divinyl(methyl)(phenyl)silane, diphenyldivinylsilane, 1,3-divinyl-1,1,3,3-tetramethyldisilazane, 1,3-divinyl-1,1,3,3-tetraphenyldisilazane, and diethoxydivinylsilane;
(A7) fluorine-containing vinyl compounds: 1,4-divinylperfluorobutane, 1,4-divinyloctafluorobutane, 1,6-divinylperfluorohexane, 1,6-divinyldodecafluorohexane, 1,8-divinylperfluorooctane, and 1,8-divinylhexadecafluorooctane.

Among them, aromatic vinyl hydrocarbons of (A1-3) group; vinyl esters, allyl esters, vinyl ethers, allyl ethers, and vinyl ketones of (A2) group; (meth)acrylic acid esters of (A3) group; vinyl compounds having polyalkylene glycol chains of (A4) group; and nitrogen-containing vinyl compounds of (A5) group are preferable. Divinylbenzene belonging to (A1-3) group; phthalic acid diallyl ester belonging to (A2-2) group; ethylene glycol di(meth)acrylate, 1,3-adamantanedimethanol di(meth)acrylate, and tricyclo[$5.2.1.0^{2,6}$]decanedimethanol di(meth)acrylate belonging to (A3) group; and methylene bis(meth)acrylamide belonging to (A5) group are more preferable. Among them, divinylbenzene and ethylene glycol di(meth)acrylate are particularly preferable.

In the present invention, when a polyfunctional monomer having two or more radically polymerizable double bonds with a bisphenol structure and a polyfunctional monomer having two or more radically polymerizable double bonds without a bisphenol structure are used together, the amount of each of the monomers used is determined from the points of view of reactivity and compatibility with epoxy resins, and a molar ratio of a polyfunctional monomer having a bisphenol structure/a polyfunctional monomer not having any bisphenol structures is preferably 99.9/0.1 to 10/90, and more preferably 99.9/0.1 to 20/80.

[Monomer B]
In the present invention, a monomer B having a fluoroalkyl group and at least one radically polymerizable double bond within its molecule preferably has either or both of a vinyl group and a (meth)acryl group. Particularly preferably, the monomer B is a compound of Formula [2] above, and more preferably, the monomer B is a compound of Formula [3] above.

Examples of the monomer B include 2,2,2-trifluoroethyl (meth)acrylate, 2,2,3,3,3-pentafluoropropyl(meth)acrylate, 2-(perfluorobutyl)ethyl(meth)acrylate, 2-(perfluorohexyl) ethyl(meth)acrylate, 2-(perfluorooctyl)ethyl(meth)acrylate, 2-(perfluorodecyl)ethyl(meth)acrylate, 2-(perfluoro-3-methylbutyl)ethyl(meth)acrylate, 2-(perfluoro-5-methylhexyl) ethyl(meth)acrylate, 2-(perfluoro-7-methyloctyl)ethyl (meth)acrylate, 1H,1H,3H-tetrafluoropropyl(meth)acrylate, 1H,1H,5H-octafluoropentyl (meth)acrylate, 1H,1H,7H-dodecafluoroheptyl(meth)acrylate, 1H,1H,9H-hexadecafluorononyl(meth)acrylate, 1H-1-(trifluoromethyl)trifluoroethyl (meth)acrylate, 1H,1H,3H-hexafluorobutyl(meth)acrylate, 3-perfluorobutyl-2-hydroxypropyl(meth)acrylate, 3-perfluorohexyl-2-hydroxypropyl(meth)acrylate, 3-perfluorooctyl-2-hydroxypropyl(meth)acrylate, 3-(perfluoro-3-methylbutyl)-2-hydroxypropyl(meth)acrylate, 3-(perfluoro-5-methylhexyl)-2-hydroxypropyl(meth)acrylate, and 3-(perfluoro-7-methyloctyl)-2-hydroxypropyl(meth)acrylate.

In the present invention, the amount of the monomer B used is determined from the points of view of reactivity and a surface modifying effect derived from a fluoroalkyl group, and the monomer B is used preferably with an amount of 5% by mole to 300% by mole, more preferably 10% by mole to 150% by mole, and still more preferably 20% by mole to 100% by mole to the number of moles of the polyfunctional monomer A used.

[Monomer C]

In the present invention, a monomer C having at least one ring-opening polymerizable group selected from the group consisting of an epoxy group and an oxetanyl group, and having at least one radically polymerizable double bond, within its molecule, preferably has either or both of a vinyl group and a (meth)acryl group, and particularly the monomer is preferably a compound of Formula [4] above.

Examples of the $C_{1-2}$ alkylene group that optionally contains an ether bond or an ester bond, which is represented by $L^2$ of Formula [4] above, include a methylene group, an ethylene group, a trimethylene group, a methylethylene group, a tetramethylene group, a 1-methyltrimethylene group, a pentamethylene group, a 2,2-dimethyltrimethylene group, a hexamethylene group, a heptamethylene group, a nonamethylene group, a undecamethylene group, a dimethylene ether group, a 2-oxapentane-1,5-diyl group, a 2-oxahexane-1,6-diyl group, a 2,5-dioxaheptane-1,7-diyl group, a 2,5,8,11-tetraoxatridecane-1,13-diyl group, a 1-oxaheptane-2-on-1,7-diyl group, a 2,7-dioxanonane-3,6-dione-1,9-diyl group, and a 2,9-dioxaundecane-8-on-1,11-diyl group.

Examples of the monomer C include a compound having an epoxy group, such as a 2,3-epoxypropyl group, a 3,4-epoxybutyl group, a 4,5-epoxypentyl group, and a 3,4-epoxycyclohexyl group; and an oxetanyl group, such as a 3-oxetanyl group, a 3-methyl-3-oxetanyl group, and a 3-ethyl-3-oxetanyl group, as a ring-opening polymerizable group.

In particular, examples of the compound of Formula [4] above include glycidyl(meth)acrylate, 3-hydroxypropyl (meth)acrylate glycidyl ether, 4-hydroxybutyl(meth)acrylate glycidyl ether, and 2-(2-glycidyloxyethoxy)ethyl(meth) acrylate.

In the present invention, the amount of the monomer C used is determined from the points of view of reactivity and dispersibility to an epoxy resin, and the monomer C is used preferably with an amount of 10% by mole to 300% by mole, more preferably 20% by mole to 200% by mole, and still more preferably 30% by mole to 150% by mole to the number of moles of the polyfunctional monomer A used.

[Polymerization Initiator D]

In the present invention, an azo polymerization initiator is preferably used as the polymerization initiator D. Examples of the azo polymerization initiator include the compounds described in (1) to (5) below.

(1) Azonitrile Compounds:

2,2'-azobisisobutyronitrile, 2,2'-azobis(2-methylbutyronitrile), 2,2'-azobis(2,4-dimethylvaleronitrile), 1,1-azobis(1-cyclohexanecarbonitrile), 2,2'-azobis(4-methoxy-2,4-dimethylvaleronitrile), and 2-(carbamoylazo)isobutyronitrile;

(2) Azoamide Compounds:

2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), and 2,2'-azobis(N-cyclohexyl-2-methylpropionamide);

(3) Cyclic Azoamidine Compounds:

2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane]dihydrochloride, 2,2'-azobis[2-(2-imidazolin-2-yl)propane], and 2,2'-azobis(1-imino-1-pyrrolidino-2-methylpropane)dihydrochloride;

(4) Azoamidine Compounds:

2,2'-azobis(2-methylpropionamidine)dihydrochloride and 2,2'-azobis[N-(2-carboxyethyl)-2-methylpropionamidine] tetrahydrate;

(5) Others:

dimethyl 2,2'-azobisisobutyrate, 4,4,-azobis(4-cyanovaleric acid), 2,2'-azobis(2,4,4*trimethylpentane), 1,1-azobis (1-acetoxy-1-phenylethane), dimethyl 1,1-azobis(1-cyclohexanecarboxylate), 4,4'-azobis(2-(trifluoromethyl)ethyl 4-cyanovalerate), 4,4'-azobis(2-(perfluorobutyl)ethyl 4-cyanovalerate), and 4,4'-azobis(2-(perfluorohexyl)ethyl 4-cyanovalerate).

Among the azo polymerization initiators described above, 2,2'-azobis(2-methylbutyronitrile) or dimethyl 2,2'-azobisisobutyrate is preferable from the points of view of dispersibility of the obtained fluorine-containing highly branched polymer to an epoxy resin and surface modifying effects, and dimethyl 2,2'-azobisisobutyrate is particularly preferable.

The polymerization initiator D is used with an amount of 5% by mole to 200% by mole, preferably 20% by mole to 200% by mole, and more preferably 20% by mole to 100% by mole to the number of moles of the polyfunctional monomer A (to the number of total moles when two or more types of polyfunctional monomers are used).

<Method for Manufacturing Fluorine-Containing Highly Branched Polymer>

A fluorine-containing highly branched polymer of the present invention can be obtained by polymerizing the polyfunctional monomer A, the monomer B, the monomer C, and the other monomer(s), under the presence of the polymerization initiator D with a given amount to the amount of the polyfunctional monomer A (to the total amount when two or more types of polyfunctional monomers are used). Known methods, such as solution polymerization, dispersion polymerization, precipitation polymerization, and bulk polymerization can be used for a method of the polymerization, and among them, solution polymerization or precipitation polymerization is preferable. In particular, the reaction is preferably performed by solution polymerization in an organic solvent, in order to control the molecular weight.

Note that a method for manufacturing a fluorine-containing highly branched polymer is also within the scope of the present invention.

Examples of the organic solvent used for the polymerization include aromatic hydrocarbons, such as benzene, toluene, xylene, ethylbenzene, and tetralin; aliphatic or alicyclic hydrocarbons, such as n-hexane, n-heptane, mineral spirit, and cyclohexane; halides, such as methyl chloride, methyl bromide, methyliodide, dichloromethane, chloroform, carbon tetrachloride, trichloroethylene, perchloroethylene, and o-dichlorobenzene; esters or ester ethers, such as ethyl acetate, butyl acetate, methoxybutyl acetate, methyl cellosolve acetate, ethyl cellosolve acetate, and propylene glycol monomethyl ether acetate; ethers, such as diethyl ether, tetrahydrofuran, 1,4-dioxane, methyl cellosolve, ethyl cellosolve, butyl cellosolve, and propylene glycol monomethyl ether; ketones, such as acetone, methyl ethyl ketone, isobutyl methyl ketone, di-n-butyl ketone, and cyclohexanone; alcohols, such as methanol, ethanol, n-propanol, isopropanol, n-butanol, isobutanol, tert-butanol, 2-ethylhexyl alcohol, benzyl alcohol, and ethylene glycol; amides, such as N,N-dimethylformamide, N,N-dimethylacetamide, and N-methyl-2-pyrrolidone; sulfoxides, such as dimethyl sulfoxide; and mixed solvents containing two or more of them.

Among them, aromatic hydrocarbons, halides, esters, ester ethers, ethers, ketones, alcohols, and amides are preferable, and particularly preferable are toluene, xylene, o-dichlorobenzene, butyl acetate, propylene glycol monomethyl ether acetate, propylene glycol monomethyl ether, 1,4-dioxane, methyl cellosolve, isobutyl methyl ketone, N,N-dimethylformamide, and N,N-dimethylacetamide.

When the polymerization reaction of the present invention is conducted under the presence of an organic solvent, a mass of the organic solvent is usually 5 parts by mass to 120 parts by mass, and preferably 10 parts by mass to 110 parts by mass, provided that the mass of the polyfunctional monomer A is 1 part by mass.

The polymerization reaction is conducted under normal pressure, under pressurization and sealing, or under reduced pressure, and is preferably conducted under normal pressure for simplicity of a device and ease of handling. In addition, the reaction is preferably conducted under inert gas atmosphere, such as $N_2$ atmosphere.

Although the polymerization reaction can be performed at any temperature, as long as it is below or equal to the boiling point of the reaction mixture, it is preferably 50° C. to 200° C., more preferably 80° C. to 150° C., and still more preferably 80° C. to 130° C., in order to improve polymerization efficiency and to regulate the molecular weight.

Although the reaction time cannot be generally specified because it varies depending on a reaction temperature; types and percentages of the polyfunctional monomer A, the monomer B, the monomer C, and the polymerization initiator 1); the type of a polymerization solvent and the like, it is preferably 30 minutes to 720 minutes, and more preferably 40 minutes to 540 minutes.

After the polymerization reaction is completed, the obtained fluorine-containing highly branched polymer is collected by any method, and if necessary, the collected polymer is subjected to aftertreatment such as washing. An example of the method for collecting the polymer from the reaction solution is reprecipitation.

The weight average molecular weight (Mw) of the fluorine-containing highly branched polymer of the present invention determined by gel permeation chromatography is 1,000 to 400,000, and preferably 2,000 to 200,000, in terms of polystyrene.

<Method for Manufacturing Varnish and Thin Film>

A specific method for forming a thin film comprising the fluorine-containing highly branched polymer of the present invention, includes: firstly, dissolving or dispersing the fluorine-containing highly branched polymer in a solvent to obtain a varnish (a film-forming material); and then coating a substrate with the varnish by a method, such as a cast coating method, a spin coating method, a blade coating method, a dip coating method, a roll coating method, a bar coating method, a dye coating method, an ink-jet method, or a printing method (anastatic, intaglio, planographic, or screen printing) to obtain a coated film. If necessary, the obtained coated film may be dried with a hot plate, an oven, or the like to form a film. Note that the varnish comprising the fluorine-containing highly branched polymer is also within the scope of the present invention.

Among these coating methods, the spin coating method is preferable. When the spin coating method is used, coating can be completed in a short time, and thus highly volatile solutions can be used, and the coating will be sufficiently uniform.

Examples of the substrate include plastics (polycarbonate, polymethacrylate, polystyrene, polyester, polyolefin, epoxy, melamine, triacetyl cellulose, the ABS (acrylonitrile-butadiene-styrene copolymer) resin, the AS (acrylonitrile-styrene copolymer) resin, a norbornene resin, and the like), metals, woods, paper, glass, and slate. The shape of the substrate may be a plate, a film, or a three-dimensionally formed body.

The solvent used to obtain the varnish is required to dissolve the fluorine-containing highly branched polymer, and examples of the solvent include aromatic hydrocarbons, such as toluene; esters or ester ethers, such as ethyl acetate, butyl acetate, ethyl lactate, γ-butyrolactone, and propylene glycol monomethyl ether acetate (PGMEA); ethers, such as tetrahydrofuran (THF), butyl cellosolve, diethylene glycol monoethyl ether, propylene glycol monomethyl ether (PGME), propylene glycol monoethyl ether, and hexafluoropropyl hexafluoro-2-pentyl ether; ketones, such as acetone, ethyl methyl ketone (MEK), isobutyl methyl ketone (MIBK), and cyclohexanone; alcohols, such as methanol and ethanol; and amides, such as N,N-dimethylformamide (DMF). These solvents may be used alone, or two or more of them may be used in combination.

Although the fluorine-containing highly branched polymer can be dissolved or dispersed in the solvent at any concentration, the concentration of the fluorine-containing highly branched polymer is 0.001% by mass to 90% by mass, preferably 0.002% by mass to 80% by mass, and more preferably 0.005% by mass to 70% by mass, to the total mass (the sum of the mass) of the fluorine-containing highly branched polymer and the solvent.

The thickness of a formed thin film comprising the fluorine-containing highly branched polymer is not particularly limited, but is usually 0.01 μm to 50 μm, and preferably 0.05 μm to 20 μm.

<Surface Modifying Agent and Method for Surface Modification>

The fluorine-containing highly branched polymer of the present invention is useful as a surface modifying agent for an epoxy resin, and the surface modifying agent is also within the scope of the present invention.

The present invention also relates to a method for performing surface modification on an epoxy resin, the method comprising: mixing the fluorine-containing highly branched polymer with an epoxy resin.

The epoxy resin that can be used will be described in the section [(b) Epoxy Resin] below.

<Epoxy Resin Composition and Epoxy Resin Cured Product Obtained from Epoxy Resin Composition>

The present invention also relates to an epoxy resin composition including (a) a fluorine-containing highly branched polymer, (b) an epoxy resin, and (c) a curing agent.

[(b) Epoxy Resin]

The epoxy resin is not particularly limited, as long as it has an epoxy group in its molecule. Examples of the epoxy resin include a bisphenol A-type epoxy resin, a hydrogenated bisphenol A-type epoxy resin, a bisphenol F-type epoxy resin, a brominated bisphenol A-type epoxy resin, a bisphenol S-type epoxy resin, a biphenyl-type epoxy resin, a naphthalene-type epoxy resin, a phenol novolac-type epoxy resin, an ortho-cresol novolac-type epoxy resin, an alicyclic epoxy resin, and a triglycidyl isocyanurate-type epoxy resin.

These epoxy resins may be used alone, or two or more of them may be used in combination.

[(c) Curing Agent]

The curing agent generally used for epoxy resins can be used without any particular limitation. Examples of the curing agent include polyamines, polyamide resins, imines, a phenol novolac resin, a cresol novolac resin, polymercaptans, poly(carboxylic acid)s, poly(carboxylic anhydride)s, imidazoles, and dicyandiamides.

In the epoxy resin composition, the content of (a) the fluorine-containing highly branched polymer is preferably 0.01 parts by mass to 20 parts by mass, and more preferably 0.1 parts by mass to 20 parts by mass relative to 100 parts by mass of the total mass of (b) the epoxy resin and (c) the curing agent.

[(d) Solvent]

An epoxy resin composition of the present invention may further contain (d) a solvent.

(d) the solvent is required to dissolve (a) the component, (b) the component, and (c) the component described above. For example, the solvents described in the section <Method for Manufacturing Varnish and Thin Film> above can be used. These solvents may be used alone, or two or more of them may be used in combination.

A solid content concentration of the epoxy resin composition of the present invention is, for example, 0.5% by mass to 50% by mass, 1% by mass to 30% by mass, or 1% by mass to 20% by mass. The solid content herein refers to a content of the epoxy resin composition, which is obtained by removing the content of a solvent component from that of the total component.

[Other Additive]

If necessary, general additives, such as a photosensitizer, a polymerization inhibitor, a polymerization initiator, a leveling agent, a surfactant, an adhesion-imparting agent, a plasticizer, an ultraviolet absorber, an antioxidant, a storage stabilizer, an antistatic agent, an inorganic filler, a pigment, and dyestuff may suitably be added to the epoxy resin composition of the present invention, unless the effects of the present invention are impaired. Also if necessary, a solvent may be mixed in the epoxy resin composition.

[Epoxy Resin Cured Product]

After a given mold is filled with the epoxy resin composition of the present invention, the epoxy resin composition is heated to be cured with a hot plate, an oven, or the like, so that a cured product can be obtained.

The thickness of a bulk body (formed product) obtained as described above is usually 0.02 mm to 10 mm, preferably 0.5 mm to 5 mm, after drying and curing processes.

When the epoxy resin composition of the present invention contains a solvent, a cured product (formed product) such as a coated film and a laminated body can also be formed by coating a substrate with the epoxy resin composition, followed by drying the composition. Materials and shapes which can be used for the substrate are described in the section <Method for Manufacturing Varnish and Thin Film> above.

The various coating methods described in the section <Method for Manufacturing Varnish and Thin Film> above can be used for coating the epoxy resin composition of the present invention. Note that, before coating, the epoxy resin composition is preferably filtered through a filter having a pore diameter of about 0.2 µm.

If necessary, the epoxy resin composition is heated after coating to remove a solvent contained therein, so that a coated film can be obtained. The obtained coated film can be used as a surface modifying film.

Although the thickness of the coated film (surface modifying film) is not particularly limited, it is usually 0.1 µm to 100 µm, and preferably 0.5 µm to 50 µm, after drying and curing processes.

As described above, in the cured product of the present invention, the fluorine-containing highly branched polymer exists more on a surface (interface) of the cured product than the inside (deep portion) of the cured product. Accordingly, the cured product has excellent mold release properties to a mixing machine, a forming machine and a mold used for producing the cured product, and to a mold; has excellent separation properties to other resin formed products such as films; and further has excellent water repellency and oil repellency and antifouling properties.

EXAMPLES

Hereinafter, the present invention will be explained more specifically according to Examples; however, the present invention is not limited to Examples below.

Apparatuses and conditions used in Examples for preparation of samples and analyses of physical properties will be listed below.

(1) Gel Permeation Chromatography (GPC)

Apparatus: HLC-8220GPC, manufactured by Tosoh Corporation

Column: Shodex (registered trademark) GPC KF-804L, and GPC KF-805L, manufactured by Showa Denko K.K.

Column temperature: 40° C.

Solvent tetrahydrofuran

Detector: RI (2) $^{13}$C NMR Spectrum

Apparatus: JNM-ECA700, manufactured by JEOL Ltd.

Solvent: $CDCl_3$ (3) Ion Chromatography (F Quantitative Analysis)

Apparatus: ICS-1500, manufactured by Nippon Dionex K.K.

Solvent: An aqueous solution of (2.7 mmol $Na_2CO_3$+0.3 mmol $NaHCO_3$)/L

Detector: Electrical conductivity (4) Measurement of Glass Transition Temperature (Tg)

Apparatus Photo-DSC 204 F1 Phoenix (registered trademark), manufactured by NETZSCH Company Measurement condition: Under nitrogen atmosphere Rate of temperature rise: 10° C./minute (0° C. to 150° C.)

(5) Measurement of 5% Weight Decrease Temperature (Td$_{5\%}$)

Apparatus: TG 8120, manufactured by Rigaku Corporation

Measurement condition: Under air atmosphere

Rate of temperature rise: 10° C./minute (25° C. to 400° C.)

(6) Ellipsometry (Measurements of a Refractive Index and a Film Thickness)

Apparatus: EC-400, manufactured by J.A. Woollam Co. Inc.

(7) Measurement of Contact Angle

Apparatus: DropMaster 501 Hi, manufactured by Kyowa Interface Science Co., Ltd.

Measurement solvent: water, and diiodomethane

Measurement temperature: 20° C.

Measurement method: When 10 seconds have passed after a measurement solvent was attached on a film surface, contact angles were measured five times for one film, and an average value of three values, in which the maximum value and the minimum value are excluded, is obtained as the value of the contact angle.

(8) Spin Coater

Apparatus: MS-A100, manufactured by MIKASA Co., Ltd.

(9) Hot Plate

Apparatus: MH-180CS and MH-3CS, manufactured by AS ONE Corporation

Abbreviations mean as follows.

BPE2.3: 2,2-bis(4-(2-methacryloyloxyethoxyl)phenyl)propane (2.3 mol of an ethoxy group) [BPE-80N, manufactured by Shin-Nakamura Chemical Co., Ltd.]

BPE2.6: 2,2-bis(4-(2-methacryloyloxyethoxy)phenyl)propane (2.6 mol of an ethoxy group) [BPE-100, manufactured by Shin-Nakamura Chemical Co., Ltd.]

BPE17: 2,2-bis(4-(2-methacryloyloxyethoxyl)phenyl)propane (17 mol of an ethoxy group) [BPE-900, manufactured by Shin-Nakamura Chemical Co., Ltd.]

DVB: divinylbenzene [DVB-960, manufactured by NIPPON STEEL & SUMIKIN CHEMICAL Co., Ltd.]

EGDMA: ethylene glycol dimethacrylate [1G, manufactured by Shin-Nakamura Chemical Co., Ltd.]

C6FA: 2-(perfluorohexyl)ethyl acrylate [CHEMINOX FAAC-6, manufactured by UNIMATEC Co., Ltd.]

HBAGE: 4-hydroxybutyl acrylate glycidyl ether [4HBAGE, manufactured by Nippon Kasei Chemical Co., Ltd.]

St: styrene [manufactured by Tokyo Chemical Industry Co., Ltd.]

MAIB: dimethyl 2,2'-azobisisobutyrate [MAIB, manufactured by Otsuka Chemical Co., Ltd.]

ER827: liquid epoxy resin [jER (registered trademark) 827, manufactured by Mitsubishi Chemical Corporation]

ER828: liquid epoxy resin [jER (registered trademark) 828, manufactured by Mitsubishi Chemical Corporation]

ERCW: epoxy resin curing agent [jERCURE (registered trademark) W, manufactured by Mitsubishi Chemical Corporation]

MH700: epoxy resin curing agent [RIKACID MH-700, manufactured by New Japan Chemical Co., Ltd.]

IPA: 2-propanol

MIBK: isobutyl methyl ketone

PGME: propylene glycol monomethyl ether

PGMEA: propylene glycol monomethyl ether acetate

THF: tetrahydrofuran

Example 1

Manufacture of Highly Branched Polymer 1 with BPE2.3, C6FA, HBAGE, and MAIB 47 g of MIBK was placed in a 200 mL reaction flask, nitrogen was flown thereinto for five minutes with stirring, and then the flask was heated until the liquid inside was refluxed (at about 116° C.).

4.2 g (9.2 mmol) of BPE2.3 as the monomer A, 2.1 g (5.1 mmol) of C6FA as the monomer B, 1.1 g (5.2 mmol) of HBAGE as the monomer C, 2.3 g (10 mmol) of MAIB as the initiator D, and 45 g of MIBK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing BPE 2.3, C6FA, HBAGE, and MAIB was added dropwise to the refluxed MIKB in the 200 mL reaction flask with a dropping pump over 55 minutes. After dropping was completed, the mixture was further stirred for one hour.

After 74 g of MIBK was removed from the reaction solution by distillation with a rotatory evaporator, the reaction solution was added to 329 g of methanol that had been cooled to about 5° C., so that a polymer was precipitated as a viscous material. The viscous material was separated by decantation, and was vacuum dried to obtain 3.7 g of the desired product (highly branched polymer 1) as a white solid (yield 39%).

The weight average molecular weight (Mw) of the obtained product, which was measured by GPC in terms of polystyrene, was 7,300, and a degree of distribution, that is, Mw (weight average molecular weight)/Mn (number average molecular weight) was 1.7. The $^{13}$C NMR spectrum of the desired product is shown in FIG. 1.

Example 2

Manufacture of Highly Branched Polymer 2 with BPE2.6, EGDMA, C6FA, HBAGE, and MAIB 65 g of MIBK was placed in a 200 mL reaction flask, nitrogen was flown thereinto for five minutes with stirring, and then the flask was heated until the liquid inside was refluxed (at about 116° C.).

2.4 g (5.0 mmol) of BPE2.6 and 3.0 g (15 mmol) of EGDMA as the monomer A, 4.2 g (10 mmol) of C6FA as the monomer B, 2.2 g (11 mmol) of HBAGE as the monomer C, 2.8 g (12 mmol) of MAIB as the initiator D, and 65 g of MIBK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing BPE2.6, EGDMA, C6FA, HBAGE, and MAIB was added dropwise to the refluxed MIBK in the 200 mL reaction flask with a dropping pump over 30 minutes. After dropping was completed, the mixture was further stirred for 90 minutes.

After 115 g of MIBK was removed from the reaction solution by distillation with a rotatory evaporator, the reaction solution was added to 381 g of methanol that had been cooled to about 5° C., so that a polymer was precipitated as slurry. The slurry was filtrated under reduced pressure, and was vacuum dried to obtain 3.4 g of the desired product (highly branched polymer 2) as a white solid (yield 24%).

Figure 2:
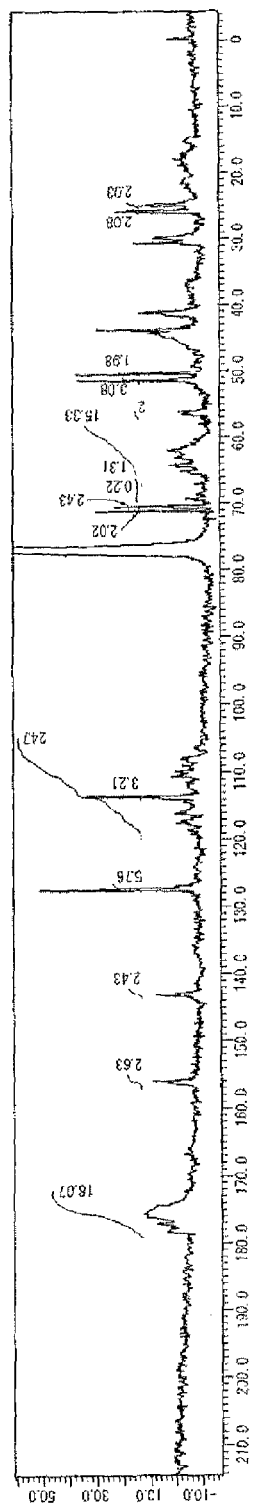
FIG. 2 shows a $^{13}C$ NMR spectrum of highly branched polymer 2 obtained in Example 2.

The weight average molecular weight (Mw) of the obtained product, which was measured by GPC in terms of polystyrene, was 11,000, and a degree of distribution, that is, Mw/Mn was 1.6. The $^{13}$C NMR spectrum of the desired product is shown in FIG. 2.

Example 3

Manufacture of Highly Branched Polymer 3 with BPE2.6, DVB, C6FA, HBAGE, and MAIB 136 g of MIBK was placed in a 200 mL reaction flask, nitrogen was flown thereinto for five minutes with stirring, and then the flask was heated until the liquid inside was refluxed (at about 116° C.).

5.3 g (11 mmol) of BPE2.6 and 2.3 g (18 mmol) of DVB as the monomer A, 4.4 g (11 mmol) of C6FA as the monomer B, 2.0 g (10 mmol) of HBAGE as the monomer C, 4.7 g (20 mmol) of MAIB as the initiator D, and 136 g of MIRK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing BPE2.6, DVB, C6FA, HBAGE, and MAIB was added dropwise to the refluxed MIBK in the 200 mL reaction flask with a dropping pump over 75 minutes. After dropping was completed, the mixture was further stirred for one hour.

After 249 g of MIBK was removed from the reaction solution by distillation with a rotatory evaporator, the reaction solution was added to 363 g of methanol that had been cooled to about 5° C., so that a polymer was precipitated as slurry. The slurry was filtered under reduced pressure, and was vacuum dried to obtain 12.6 g of the desired product (highly branched polymer 3) as a white solid (yield 74%).

Figure 3:
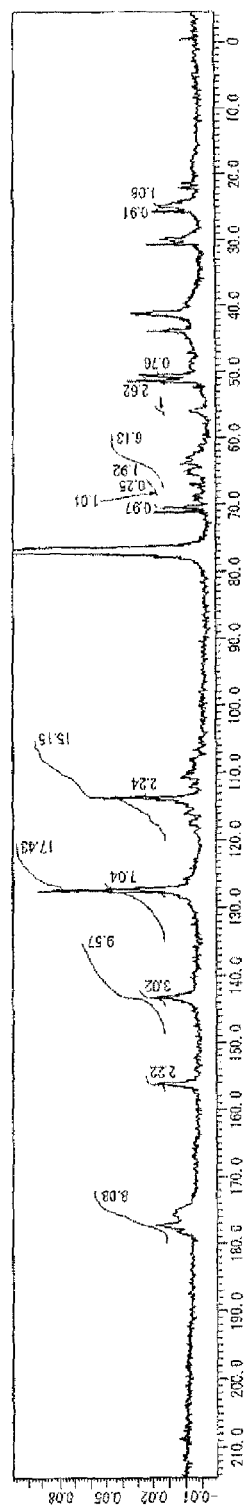
FIG. 3 shows a $^{13}C$ NMR spectrum of highly branched polymer 3 obtained in Example 3.

The weight average molecular weight (Mw) of the obtained product, which was measured by GPC in terms of polystyrene, was 11,000, and a degree of distribution, that is, Mw/Mn was 2.2. The $^{13}$C NMR spectrum of the desired product is shown in FIG. 3.

Example 4

Manufacture of Highly Branched Polymer 4 with BPE17, DVB, C6FA, HBAGE, and MAIB 199 g of MIBK was placed in a 500 mL reaction flask, nitrogen was flown thereinto for five minutes with stirring, and then the flask was heated until the liquid inside was refluxed (at about 116° C.).

11.1 g (10 mmol) of BPE17 and 2.0 g (15 mmol) of DVB as the monomer A, 4.2 g (10 mmol) of C6FA as the monomer B, 2.2 g (11 mmol) of HBAGE as the monomer C, 4.6 g (20 mmol) of MAIB as the initiator D, and 197 g of MIBK were placed in another 300 mL reaction flask, nitrogen was flown thereinto for five minutes with stirring to perform replacement with nitrogen, and then the flask was cooled to a temperature of 0° C. to 5° C. in an ice bath.

The content of the 300 mL reaction flask containing BPE17, DVB, C6FA, HBAGE, and MAIB was added dropwise to the refluxed MIBK in the 500 mL reaction flask with a dropping pump over 65 minutes. After dropping was completed, the mixture was further stirred for one hour.

After 354 g of MIBK was removed from the reaction solution by distillation with a rotatory evaporator, the reaction solution was added to 405 g of hexane that had been cooled to about 5° C., so that a polymer was precipitated as a viscous material. The viscous material was separated by decantation, and was vacuum dried to obtain 16.3 g of the desired product (highly branched polymer 4) as a white solid (yield 70%).

Figure 4:
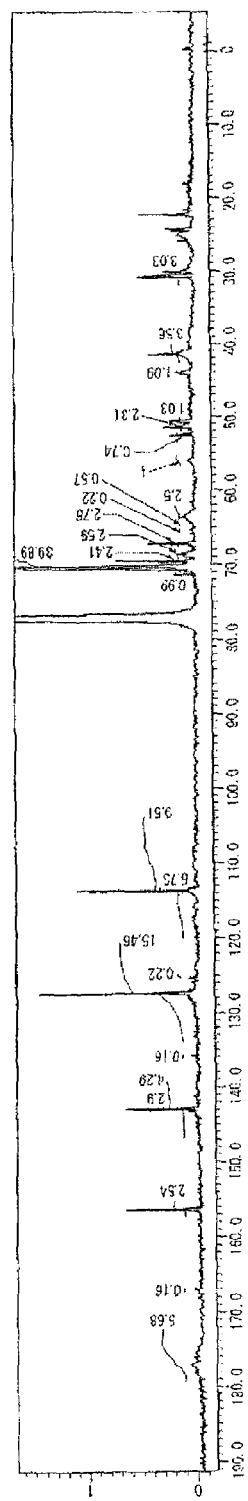
FIG. 4 shows a $^{13}C$ NMR spectrum of highly branched polymer 4 obtained in Example 4.

The weight average molecular weight (Mw) of the desired product, which was measured by GPC in terms of polystyrene, was 18,000, and a degree of distribution, that is, Mw/Mn was 3.5. The $^{13}$C NMR spectrum of the desired product is shown in FIG. 4.

Reference Example 1

Manufacture of Highly Branched Polymer 5 with EGDMA, C6FA, and MAIB 32 g of toluene was placed in a 200 mL reaction flask, nitrogen was flown thereinto for five minutes with stirring, and then the flask was heated until the liquid inside was refluxed (at about 110° C.).

4.0 g (20 mmol) of EGDMA as the monomer A, 4.2 g (10 mmol) of C6FA as the monomer B, 2.3 g (10 mmol) of MAIB as the initiator D, and 32 g of toluene were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing EGDMA, C6FA, and MAIB was added dropwise to the refluxed toluene in the 200 mL reaction flask with a dropping pump over 30 minutes. After dropping was completed, the mixture was further stirred for one hour.

The reaction solution was added to 277 g of hexane/toluene (the mass ratio was 4:1), so that a polymer was precipitated as slurry. The slurry was filtered under reduced pressure, and was re-dissolved in 36 g of THF. The THF solution was added to 277 g of hexane, so that a polymer was re-precipitated as slurry. The slurry was filtered under reduced pressure, and was vacuum dried to obtain 4.9 g of the desired product (highly branched polymer 5) as white powder (yield 48%).

Figure 5:
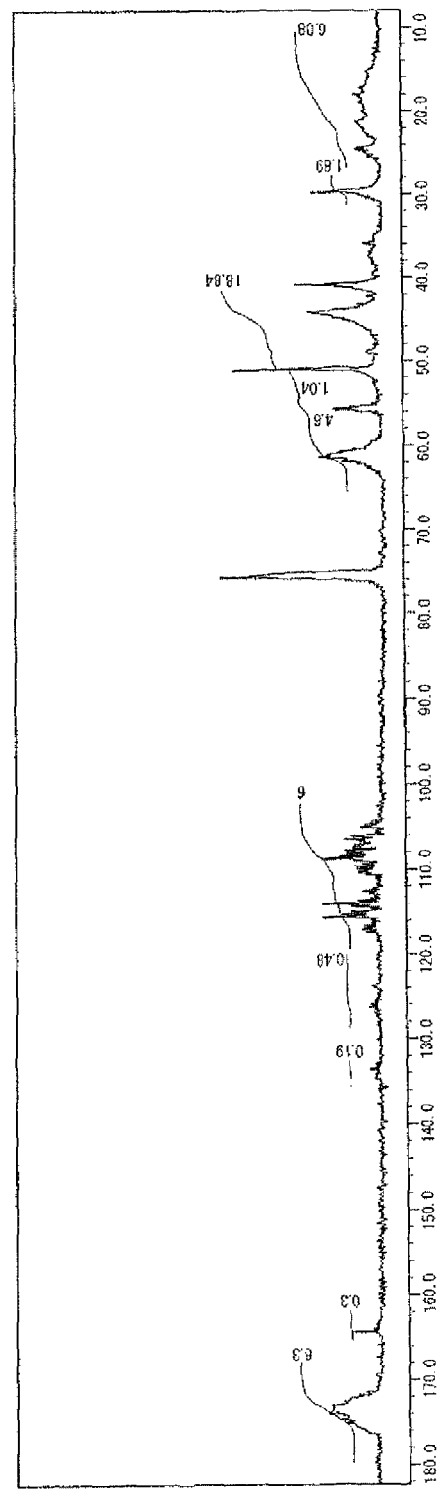
FIG. 5 shows a $^{13}C$ NMR spectrum of highly branched polymer 5 obtained in Reference Example 1.

The weight average molecular weight (Mw) of the obtained product, which was measured by GPC in terms of polystyrene, was 17,000, and a degree of distribution, that is, Mw/Mn was 2.2. The $^{13}$C NMR spectrum of the desired product is shown in FIG. 5.

Reference Example 2

Manufacture of Highly Branched Polymer 6 with EGDMA, C6FA, HBAGE, and MAIB 40 g of MIBK was placed in a 200 mL reaction flask, nitrogen was flown thereinto for five minutes with stirring, and then the flask was heated until the liquid inside was refluxed (at about 116° C.).

4.2 g (21 mmol) of EGDMA as the monomer A, 4.2 g (10 mmol) of C6FA as the monomer B, 2.0 g (10 mmol) of HBAGE as the monomer C, 2.8 g (12 mmol) of MAIB as the initiator D, and 40 g of MIBK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing EGDMA, C6FA, HBAGE, and MAIB was added dropwise to the refluxed MIBK in the 200 mL reaction flask with a dropping pump over 70 minutes. After dropping was completed, the mixture was further stirred for one hour.

After 69 g of MIBK was removed from the reaction solution by distillation with a rotatory evaporator, the reaction solution was added to 282 g of hexane that had been cooled to about 5° C., so that a polymer was precipitated as a viscous material. The viscous material was separated by decantation, and was vacuum dried to obtain 8.5 g of the desired product (highly branched polymer 6) as a white solid (yield 68%).

Figure 6:
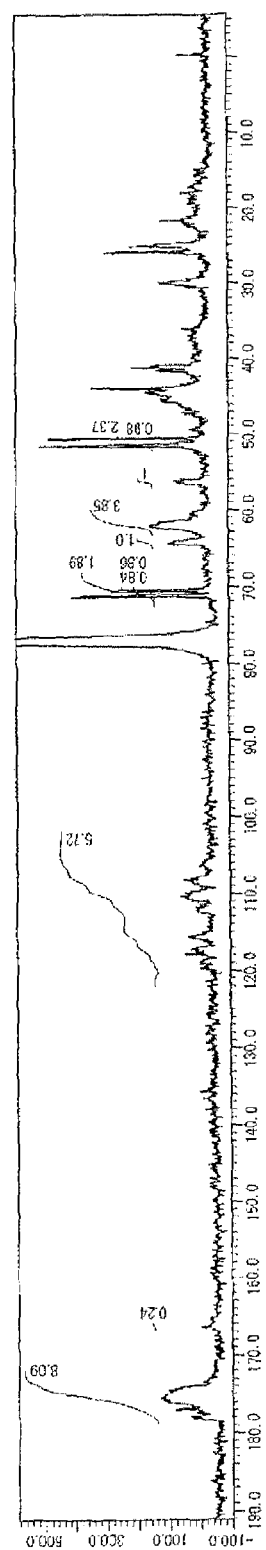
FIG. 6 shows a $^{13}C$ NMR spectrum of highly branched polymer 6 obtained in Reference Example 2.

The weight average molecular weight (Mw) of the obtained product, which was measured by GPC in terms of polystyrene, was 7,200, and a degree of distribution, that is, Mw/Mn was 2.2. The $^{13}$C NMR spectrum of the desired product is shown in FIG. 6.

Reference Example 3

Manufacture of Highly Branched Polymer 7 with DVB, C6FA, HBAGE, St, and MAIB 61 g of MIBK was placed in a 200 mL reaction flask, nitrogen was flown thereinto for five minutes with stirring, and then the flask was heated until the liquid inside was refluxed (at about 116° C.).

2.1 g (16 mmol) of DVB as the monomer A, 2.2 g (5.3 mmol) of C6FA as the monomer B, 1.0 g (5.2 mmol) of HBAGE as the monomer C, 1.4 g (14 mmol) of St as another monomer, 2.3 g (10 mmol) of MAIB as the initiator D, and 61 g of MIBK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing DVB, C6FA, HBAGE, St, and MAIB was added dropwise to the refluxed MIBK in the 200 mL reaction flask with a dropping pump over 80 minutes. After dropping was completed, the mixture was further stirred for one hour.

After 111 g of MIBK was removed from the reaction solution by distillation with a rotatory evaporator, the reaction solution was added to 215 g of methanol that had been cooled to about 5° C., so that a polymer was precipitated as slurry. The slurry was filtered under reduced pressure, and was vacuum dried to obtain 4.4 g of the desired product (highly branched polymer 7) as a white solid (yield 43%).

Figure 7:
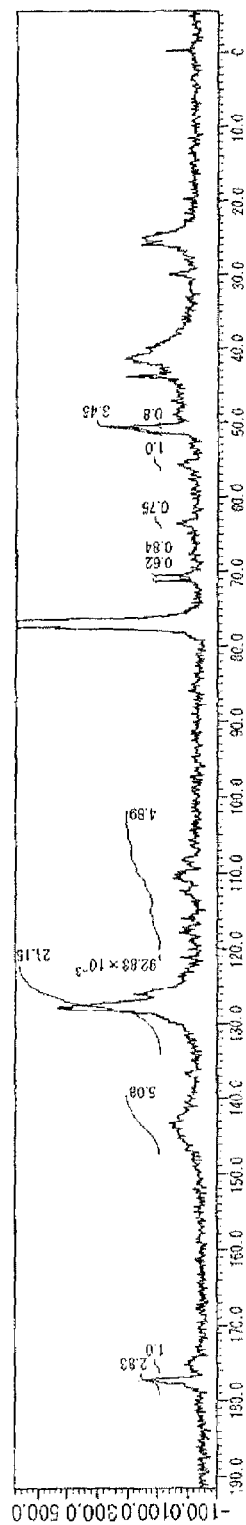
FIG. 7 shows a $^{13}C$ NMR spectrum of highly branched polymer 7 obtained in Reference Example 3.

The weight average molecular weight (Mw) of the obtained product, which was measured by GPC in terms of polystyrene, was 16,000, and a degree of distribution, that is, Mw/Mn was 1.7. The $^{13}$C NMR spectrum of the desired product is shown in FIG. 7.

Reference Example 4

Manufacture of Highly Branched Polymer 8 with BPE2.6, C6FA, and MAIB 48 g of MIBK was placed in a 200 mL reaction flask, nitrogen was flown thereinto for five minutes with stirring, and then the flask was heated until the liquid inside was refluxed (at about 116° C.).

4.8 g (10 mmol) of BPE 2.6 as the monomer A, 2.1 g (5.1 mmol) of C6FA as the monomer B, 1.4 g (6.0 mmol) of MAIB as the initiator D, and 48 g of MIBK were placed in another 100 mL reaction flask, nitrogen was flown thereinto for five minutes with stirring to perform replacement with nitrogen, and then the flask was cooled to a temperature of 0° C. to 5° C. in an ice bath.

The content of the 100 mL reaction flask containing BPE2.6, C6FA, and MAIB, was added dropwise to the refluxed MIBK in the 200 rut reaction flask with a dropping pump over 30 minutes. After dropping was completed, the mixture was further stirred for one hour.

After 77 g of MIBK was removed from the reaction solution by distillation with a rotatory evaporator, the reaction solution was added to 239 g of methanol that had been cooled to about 5° C., so that a polymer was precipitated as slurry. The slurry was filtered under reduced pressure, and was vacuum dried to obtain 3.8 g of the desired product (highly branched polymer 8) as white powder (yield 44%).

Figure 8:
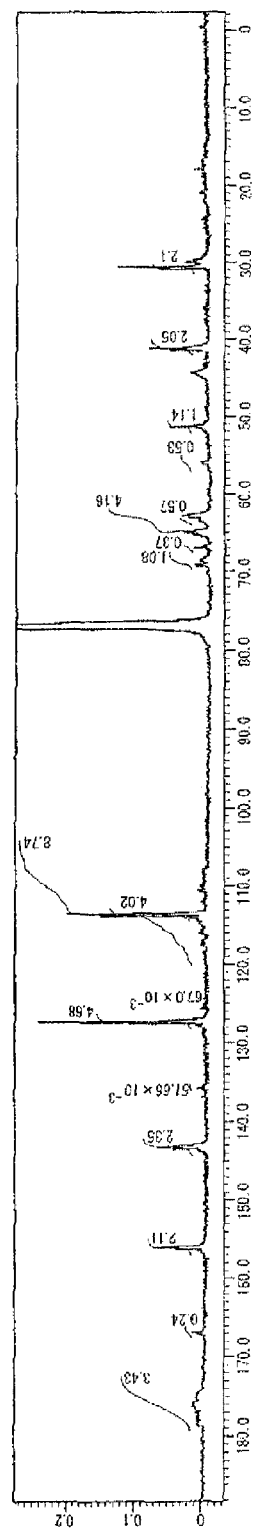
FIG. 8 shows a $^{13}C$ NMR spectrum of highly branched polymer 8 obtained in Reference Example 4.

The weight average molecular weight (Mw) of the obtained product, which was measured by GPC in terms of polystyrene, was 12,000, and a degree of distribution, that is, Mw/Mn was 2.0. The $^{13}$C NMR spectrum of the desired product is shown in FIG. 8.

Table 1 shows types of monomers A (mixing molar ratios when two or more types are used), usage of monomers B and C, and initiators D relative to amounts of monomers A (total amounts of them when two or more types are used) [% by mole], weight average molecular weights (Mw), degrees of distributions (Mw/Mn), glass transition temperatures (Tg) [° C.], 5% weight decrease temperature ($Td_{5\%}$) [° C.], introduced amounts of monomers B and C calculated from $^{13}$C NMR spectra [% by mole], and F atom contents calculated from F quantitative analyses [% by mass] of highly branched polymers 1 to 8 obtained in Examples 1 to 4 and Reference Examples 1 to 4.

TABLE 1

| Highly Branched Polymer | Monomer A Type | Monomer A Molar Ratio | C6FA Usage [% by mole] | HBAGE Usage [% by mole] | MAIB Usage [% by mole] | Mw | Mw/Mn | Tg [° C.] | $Td_{5\%}$ [° C.] | C6FA Introduced Amount [% by mole] | F Atom Content [% by mass] | HBAGE Introduced Amount [% by mole] |
|---|---|---|---|---|---|---|---|---|---|---|---|---|
| 1 | BPE2.3 | — | 55 | 57 | 109 | 7,300 | 1.7 | 44.0 | 290.1 | 16 | 12 | 20 |
| 2 | BPE2.6 EGDMA | 1 3 | 50 | 55 | 60 | 11,000 | 1.6 | 91.8 | 286.7 | 18 | 17 | 35 |
| 3 | BPE2.6 DVB | 2 3 | 38 | 34 | 69 | 11,000 | 2.2 | 55.9 | 309.9 | 17 | 12 | 17 |
| 4 | BPE17 DVB | 2 3 | 40 | 44 | 80 | 18,000 | 3.5 | None | 196.1 | 15 | 8 | 15 |
| 5 | EGDMA | — | 50 | — | 50 | 17,000 | 2.2 | 79.6 | 272.1 | 25 | 48 | — |
| 6 | EGDMA | — | 48 | 48 | 57 | 7,200 | 2.2 | 30.9 | 254.9 | 20 | 19 | 18 |
| 7 | DVB | — | 33 | 33 | 63 | 16,000 | 1.7 | 85.2 | 325.5 | 14 | 15 | 9 |
| 8 | BPE2.6 | — | 51 | — | 60 | 12,000 | 2.0 | 58.2 | 292.0 | 24 | 13 | — |

Example 5

Production and Physical Property Evaluation of Single Thin Film of Highly Branched Polymers 1 to 4

A concentration of 5% by mass solution was prepared for each of highly branched polymers 1 to 4 obtained in Examples 1 to 4, with the solvent shown in Table 2. The prepared solution was filtrated to obtain the varnish of each of the highly branched polymers. A glass substrate was spin coated with the varnish (slope of 5 seconds, 1,500 rpm×30 seconds, slope of 5 seconds), and was heated on a hot plate at 100° C. for 30 minutes to remove a solvent, so that a thin film was produced.

The contact angle with water or diiodomethane of the obtained thin film was evaluated. The surface energy was also calculated from the result of the contact angle. The obtained results are shown in Table 2.

[Comparative Example 1] Production and Physical Property Evaluation of Single Thin Film of Highly Branched Polymers 5 to 8

A thin film was produced for each of highly branched polymers 5 to 8 obtained in Reference Examples 1 to 4 in the same manner as in Example 5, and was evaluated. The results are shown in Table 2.

TABLE 2

| | Solvent | Contact Angle [degree] | | Surface Energy [mJ/m$^2$] |
| --- | --- | --- | --- | --- |
| | | H$_2$O | CH$_2$I$_2$ | |
| Highly Branched Polymer 1 | MIBK | 103.4 | 53.6 | 32.8 |
| Highly Branched Polymer 2 | PGME | 101.1 | 59.7 | 28.8 |
| Highly Branched Polymer 3 | MIBK | 101.9 | 53.6 | 32.6 |
| Highly Branched Polymer 4 | MIBK | 102.0 | 11.9 | 53.2 |
| Highly Branched Polymer 5 | PGMEA | 104.4 | 76.1 | 19.6 |
| Highly Branched Polymer 6 | PGMEA | 102.1 | 74.4 | 20.6 |
| Highly Branched Polymer 7 | MIBK | 100.8 | 61.9 | 27.5 |
| Highly Branched Polymer 8 | MIBK | 94.6 | 61.9 | 27.7 |

[Surface Modification of Epoxy Resin Using the Highly Branched Polymer (without Solvent)]

Example 6

To a mixture of 100 parts by mass of ER827 that is a bisphenol A-type epoxy resin and 24 parts by mass of ERCW that is an epoxy resin curing agent, 0.12 parts by mass of highly branched polymer 1 obtained in Example 1 was added as a surface modifying agent, and the mixture was stirred at 50° C. for three hours to prepare an epoxy resin composition. The composition was visually confirmed, and compatibility of the surface modifying agent and the epoxy resin was evaluated according to the criteria below. The results are shown in Table 3.

Then, a glass substrate was spin coated with the obtained epoxy resin composition (slope of 5 seconds, 2,000 rpm×30 seconds, slope of 5 seconds), and was heated on a hot plate at 100° C. for 2 hours, and was further heated on a hot plate at 175° C. for 4 hours, so that an epoxy resin cured film was produced.

The contact angle with water or IPA of the obtained cured film was measured to evaluate liquid repellency. The obtained results are also shown in Table 3.

[Criteria for Evaluating Compatibility]

○: Uniformly dissolved, and the solution is not cloudy, or the residue not dissolved is not observed.

X: The surface modifying agent that has not been dissolved can be observed, or the solution is cloudy.

Example 7

Procedures and evaluation were performed in the same manner as in Example 6, except that the surface modifying agent was changed to the highly branched polymer 2 obtained in Example 2. The results are also shown in Table 3.

Example 8

Procedures and evaluation were performed in the same manner as in Example 6, except that the surface modifying agent was changed to the highly branched polymer 3 obtained in Example 3. The results are also shown in Table 3.

Example 9

Procedures and evaluation were performed in the same manner as in Example 6, except that the surface modifying agent was changed to the highly branched polymer 4 obtained in Example 4. The results are also shown in Table 3.

Comparative Example 2

Procedures were performed in the same manner as in Example 6, except that the surface modifying agent was changed to the highly branched polymer 5 obtained in Reference Example 1; however, compatibility of the surface modifying agent and the epoxy resin was not sufficient, and a uniform film cannot be produced by the spin coating method.

Comparative Example 3

Procedures were performed in the same manner as in Example 6, except that the surface modifying agent was changed to the highly branched polymer 6 obtained in Reference Example 2; however, compatibility of the surface modifying agent and the epoxy resin was not sufficient, and a uniform film cannot be produced by the spin coating method.

Comparative Example 4

Procedures were performed in the same manner as in Example 6, except that the surface modifying agent was changed to the highly branched polymer 7 obtained in Reference Example 3; however, compatibility of the surface modifying agent and the epoxy resin was not sufficient, and a uniform film cannot be produced by the spin coating method.

Comparative Example 5

Procedures and evaluation were performed in the same manner as in Example 6, except that the surface modifying agent was changed to the highly branched polymer 8 obtained in Reference Example 4. The results are also shown in Table 3.

[Surface Properties of the Epoxy Resin Cured Film to which the Surface Modifying Agent is not Added (without Solvent)]

Comparative Example 6

Procedures and evaluation were performed in the same manner as in Example 6, except that the surface modifying agent (highly branched polymer) was not added. The results are also shown in Table 3.

TABLE 3

| | Surface Modifying Agent | Compat- ibility | Contact Angle [degree] | |
|---|---|---|---|---|
| | | | H$_2$O | IPA |
| Example 6 | Highly Branched Polymer 1 | ○ | 101.3 | 25.2 |
| Example 7 | Highly Branched Polymer 2 | ○ | 102.3 | 34.1 |
| Example 8 | Highly Branched Polymer 3 | ○ | 96.4 | 24.0 |
| Example 9 | Highly Branched Polymer 4 | ○ | 94.5 | 30.7 |
| Comparative Example 2 | Highly Branched Polymer 5 | X | — | — |
| Comparative Example 3 | Highly Branched Polymer 6 | X | — | — |
| Comparative Example 4 | Highly Branched Polymer 7 | X | — | — |
| Comparative Example 5 | Highly Branched Polymer 8 | ○ | 103.1 | 34.6 |
| Comparative Example 6 | None | — | 80.6 | <3 |

[Surface Modification (Diluted with the Solvent) and Durability of the Epoxy Resin Using the Highly Branched Polymer]

Examples 10 to 13, and Comparative Examples 7 and 8

To a mixture of 100 parts by mass of ER828 that is a bisphenol A-type epoxy resin, 45 parts by mass of MI-1700 that is an epoxy resin curing agent, and 100 parts by mass of MIBK, 1.5 parts by mass of the surface modifying agent shown in Table 4 was added. The mixture was stirred at a room temperature (about 25° C.) until a homogenous solution was obtained, and then the solution was filtrated to prepare an epoxy resin composition.

A glass substrate was spin coated with the obtained epoxy resin composition (slope of 5 seconds, 200 rpm×30 seconds, slope of 5 seconds), and was heated on a hot plate at 200° C. for 2 hours, so that an epoxy resin cured film was produced.

The contact angle with water or IPA of the obtained cured film was measured to evaluate liquid repellency. The obtained results are also shown in Table 4.

Additionally, the cured film was immersed in acetone or 5% by mass sodium hydroxide aqueous solution for one minute, washed with water, and then dried with an air gun. After the cured film was dried, the contact angle with water or IPA thereof was measured again to evaluate organic solvent resistance and alkali resistance regarding liquid repellency. The results are also shown in Table 4.

Note that the decreasing rate in the table was calculated by (contact angle value before immersion−contact angle value after immersion)/contact angle value before immersion

[Surface Properties (Diluted with the Solvent) and Durability of the Epoxy Resin Cured Film to which the Surface Modifying Agent is not Added]

Comparative Example 9

Procedures and evaluation were performed in the same manner as in Example 10, except that the surface modifying agent (highly branched polymer) was not added. The results are also shown in Table 4.

TABLE 4

| | Surface Modifying Agent | H$_2$O Contact Angle [degree] | | | | | IPA Contact Angle [degree] | | | | |
|---|---|---|---|---|---|---|---|---|---|---|---|
| | | Before Immersion | After Immersion | | Decreasing Rate [%] | | Before Immersion | After Immersion | | Decreasing Rate [%] | |
| | | | Acetone | NaOH | Acetone | NaOH | | Acetone | NaOH | Acetone | NaOH |
| Example 10 | Highly Branched Polymer 1 | 101.3 | 95.4 | 97.2 | 6 | 4 | 26.4 | 21.5 | 23.2 | 19 | 12 |
| Example 11 | Highly Branched Polymer 2 | 100.7 | 97.3 | 103.6 | 3 | −3 | 31.8 | 29.1 | 29.3 | 8 | 8 |
| Example 12 | Highly Branched Polymer 3 | 97.9 | 93.6 | 97.9 | 4 | 0 | 25.7 | 20.1 | 21.1 | 22 | 18 |
| Example 13 | Highly Branched Polymer 4 | 98.9 | 93.8 | 94.6 | 5 | 4 | 22.8 | 18.4 | 21.6 | 19 | 5 |
| Comparative Example 7 | Highly Branched Polymer 5 | 103.6 | 93.5 | 97.5 | 10 | 6 | 36.2 | 23.9 | 31.4 | 34 | 13 |
| Comparative Example 8 | Highly Branched Polymer 8 | 102.4 | 98.5 | 94.5 | 4 | 8 | 38.2 | 19.9 | 29.3 | 48 | 23 |
| Comparative Example 9 | None | 80.3 | 81.2 | 82.3 | −1 | −2 | <3 | <3 | 4.9 | — | — |

* Each of the contact angle values in Comparative Example 7 is a reference value, due to inaccurate measurement because compatibility of the resin composition is insufficient and the cured film is not uniform.

According to the results shown in Table 4, when the epoxy resin cured film, to which the highly branched polymer 8 not having the unit structure derived from HBAGE that is the monomer C was added as a surface modifying agent, was immersed in acetone or 5% by mass sodium hydroxide aqueous solution, the contact angle with IPA was significantly decreased (Comparative Example 8). On the other hand, when the epoxy resin cured film, to which the highly branched polymer of the present invention was added as a surface modifying agent, was immersed in acetone or 5% by mass sodium hydroxide aqueous solution, the contact angle with IPA was not significantly decreased compared to Comparative Example 8 (Examples 10 to 13).

These results suggest that, by adding the highly branched polymer of the present invention to the epoxy resin, a resin film obtained from the resin can be water repellent and liquid repellent, and the water repellency and liquid repellency of the resin film can be maintained without significant decrease even if the resin film is immersed in an organic solvent or an alkaline aqueous solution.

The invention claimed is:

1. A fluorine-containing highly branched polymer, comprising:
   (i) a polyfunctional monomer A that has two or more radically polymerizable double bonds and all or a portion of which has a bisphenol structure,
   (ii) a monomer B having a fluoroalkyl group and at least one radically polymerizable double bond,
   (iii) a monomer C having at least one ring-opening polymerizable group selected from the group consisting of an epoxy group and an oxetanyl group, and at least one radically polymerizable double bond, and
   (iv) a polymerization initiator D in an amount of 5% by mole to 200% by mole to the number of moles of the polyfunctional monomer A;
   wherein the fluorine-containing highly branched polymer has a weight average molecular weight of 1,000 to 400,000, and
   the fluorine-containing highly branched polymer is obtained by using the monomer B with an amount of 10% by mole to 300% by mole to the number of moles of the polyfunctional monomer A.

2. The fluorine-containing highly branched polymer according to claim 1, wherein
   the polyfunctional monomer A is a compound having either or both of a vinyl group and a (meth)acryl group.

3. The fluorine-containing highly branched polymer according to claim 2, wherein
   the polyfunctional monomer A is a divinyl compound or a di(meth)acrylate compound.

4. The fluorine-containing highly branched polymer according to claim 3, wherein
   the polyfunctional monomer A includes a compound of Formula [1]:

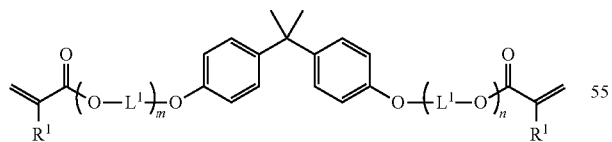

where $R^1$ is a hydrogen atom or a methyl group; each $L^1$ is independently a $C_{1-6}$ alkylene group; and each of m and n is independently an integer of 0 to 30.

5. The fluorine-containing highly branched polymer according to claim 4, wherein
   the polyfunctional monomer A is the compound of Formula [1].

6. The fluorine-containing highly branched polymer according to claim 1, wherein
   a monomer belonging to the polyfunctional monomer A and not having a bisphenol structure, is a compound having either or both of a vinyl group and a (meth)acryl group.

7. The fluorine-containing highly branched polymer according to claim 6, wherein
   the monomer belonging to the polyfunctional monomer A and not having a bisphenol structure, is divinylbenzene and/or ethylene glycol di(meth)acrylate.

8. The fluorine-containing highly branched polymer according to claim 1, wherein
   the monomer B is a compound having either or both of a vinyl group and a (meth)acryl group.

9. The fluorine-containing highly branched polymer according to claim 8, wherein
   the monomer B is a compound of Formula [2]:

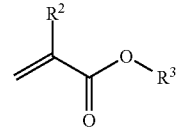

where $R^2$ is a hydrogen atom or a methyl group; and $R^3$ is a $C_{2-12}$ fluoroalkyl group optionally substituted with a hydroxy group.

10. The fluorine-containing highly branched polymer according to claim 9, wherein
    the monomer B is a compound of Formula [3]:

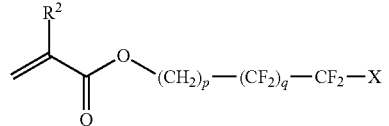

where $R^2$ is the same as that defined in Formula [2]; X is a hydrogen atom or a fluorine atom; p is 1 or 2; and q is an integer of 0 to 5.

11. The fluorine-containing highly branched polymer according to claim 1, wherein
    the monomer C is a compound having either or both of a vinyl group and a (meth)acryl group.

12. The fluorine-containing highly branched polymer according to claim 11, wherein
    the monomer C is a compound of Formula [4]:

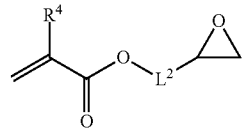

where $R^4$ is a hydrogen atom or a methyl group; $L^2$ is a single bond or a $C_{1-12}$ alkylene group that optionally contains an ether bond or an ester bond.

13. The fluorine-containing highly branched polymer according to claim 1, wherein
    the polyfunctional monomer A includes a compound of Formula [1], the monomer B is a compound of Formula [2], and the monomer C is a compound of Formula [4]:

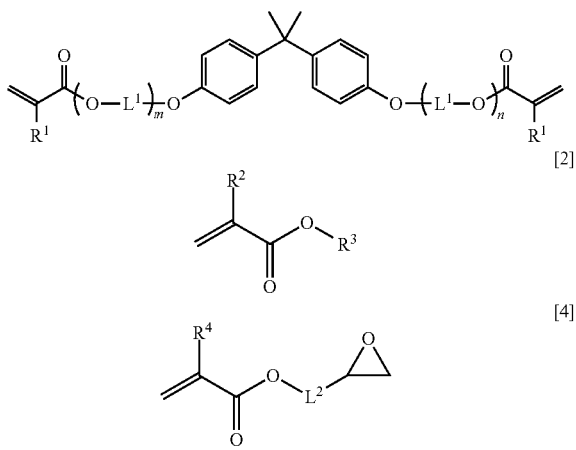

where each of $R^1$, $R^2$, and $R^4$ is independently a hydrogen atom or a methyl group; $R^3$ is a $C_{2-12}$ fluoroalkyl group optionally substituted with a hydroxy group; each $L^1$ is independently a $C_{1-6}$ alkylene group; $L^2$ is a single bond or a $C_{1-12}$ alkylene group that optionally contains an ether bond or an ester bond; and each of m and n is independently an integer of 0 to 30.

14. The fluorine-containing highly branched polymer according to claim 13, wherein
the polyfunctional monomer A is a compound of Formula [1], and divinylbenzene and/or ethylene glycol di(meth)acrylate.

15. The fluorine-containing highly branched polymer according to claim 1, wherein
the polymerization initiator D is an azo polymerization initiator.

16. The fluorine-containing highly branched polymer according to claim 15, wherein
the polymerization initiator D is dimethyl 2,2'-azobisisobutyrate.

17. The fluorine-containing highly branched polymer according to claim 1, wherein the fluorine-containing highly branched polymer is obtained by using the monomer C with an amount of 10% by mole to 300% by mole to the number of moles of the polyfunctional monomer A.

18. A varnish comprising:
the fluorine-containing highly branched polymer as claimed in claim 1.

19. A thin film comprising:
the fluorine-containing highly branched polymer as claimed in claim 1.

20. A surface modifying agent for an epoxy resin, comprising:
the fluorine-containing highly branched polymer as claimed in claim 1.

21. A method for performing surface modification on an epoxy resin, the method comprising:
mixing the fluorine-containing highly branched polymer as claimed in claim 1 with an epoxy resin.

22. An epoxy resin composition comprising:
(a) the fluorine-containing highly branched polymer as claimed in claim 1;
(b) an epoxy resin; and
(c) a curing agent.

23. The resin composition according to claim 22, wherein the content of (a) the fluorine-containing highly branched polymer is 0.01 parts by mass to 20 parts by mass relative to 100 parts by mass of the total mass of (b) the epoxy resin and (c) the curing agent.

24. The resin composition according to claim 23, further comprising (d) a solvent.

25. An epoxy resin cured product obtained from the resin composition as claimed in claim 22.

26. The fluorine-containing highly branched polymer according to claim 1, wherein the polyfunctional monomer A having the bisphenol structure is selected from the group consisting of bisphenol A di(meth)acrylate, methoxylated bisphenol A di(meth)acrylate, propoxylated bisphenol A di(meth)acrylate, and propoxylated ethoxylated bisphenol A di(meth)acrylate.

27. The fluorine-containing highly branched polymer according to claim 1, wherein a molar ratio of the polyfunctional monomer A having the bisphenol structure to a polyfunctional monomer A not having any bisphenol structure is 99.9:0.1 to 10:90.

28. The fluorine-containing highly branched polymer according to claim 1, further comprising a second polyfunctional monomer A having two or more radically polymerizable double bonds without a bisphenol structure.

29. A resin composition comprising:
(a) the fluorine-containing highly branched polymer as claimed in claim 28;
(b) an epoxy resin; and
(c) a curing agent.

30. A method for manufacturing a fluorine-containing highly branched polymer, the method comprising:
polymerizing a polyfunctional monomer A that has two or more radically polymerizable double bonds and all or a portion of which has a bisphenol structure, a monomer B having a fluoroalkyl group and at least one radically polymerizable double bond, within a molecule, and a monomer C having at least one ring-opening polymerizable group selected from the group consisting of an epoxy group and an oxetanyl group, and having at least one radically polymerizable double bond, within a molecule, under the presence of a polymerization initiator D with an amount of 5% by mole to 200% by mole to the number of moles of the polyfunctional monomer A,
wherein the fluorine-containing highly branched polymer has a weight average molecular weight of 1,000 to 400,000, and
the fluorine-containing highly branched polymer is obtained by using the monomer B with an amount of 10% b mole to 300% by mole to the number of moles of the polyfunctional monomer A.

* * * * *